(12) United States Patent
Sugita

(10) Patent No.: US 6,678,337 B1
(45) Date of Patent: Jan. 13, 2004

(54) METHOD AND DEVICE FOR DEMODULATING RECEIVE SIGNAL INCLUDING A PILOT SIGNAL

(75) Inventor: Naohiko Sugita, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/368,952

(22) Filed: Aug. 5, 1999

(30) Foreign Application Priority Data

Aug. 5, 1998 (JP) .......................................... 10-221418

(51) Int. Cl.⁷ .......................... H04L 27/16; H04L 25/03
(52) U.S. Cl. ....................................... 375/324; 375/346
(58) Field of Search ................................ 375/346, 348, 375/316, 355, 365–372; 455/63

(56) References Cited

U.S. PATENT DOCUMENTS

| | | | | |
|---|---|---|---|---|
| 5,596,608 A | * | 1/1997 | Sassa et al. .................. | 375/346 |
| 5,822,725 A | * | 10/1998 | Komatsu et al. ............ | 704/226 |
| 6,075,823 A | * | 6/2000 | Sonoda ........................ | 375/267 |
| 6,493,330 B1 | * | 12/2002 | Miya et al. .................. | 370/335 |
| 6,510,190 B1 | * | 1/2003 | Wu et al. .................... | 375/355 |

FOREIGN PATENT DOCUMENTS

| | | |
|---|---|---|
| JP | 6-216810 | 8/1994 |
| JP | 8-149176 | 6/1996 |
| WO | WO 96/01004 A1 | 1/1996 |

OTHER PUBLICATIONS

S. Sanpei, "Compensation System of Fading Distortion of 16QAM for Overland Mobile Communications", *Technical Report of IEICE*, B–11, No. 1, 1989, pp. 7–15.

* cited by examiner

Primary Examiner—Stephen Chin
Assistant Examiner—Lawrence Williams
(74) Attorney, Agent, or Firm—Sughrue Mion, PLLC

(57) ABSTRACT

A method for demodulating a received signal including a pilot signal while estimating the fading distortion of data by detecting the fading distortion of a unique word as the pilot signal inserted into multiple sections of the received signal, the method having the steps of: (1) setting part of data as an extended the unique word; (2) detecting the fading distortion of the unique word as the pilot signal as a first fading distortion and detecting the fading distortion of the extended unique word as a second fading distortion; (3) estimating the fading distortion of data based on the first and second fading distortions; and (4) demodulating data based on the fading distortion of data.

33 Claims, 10 Drawing Sheets

METHOD AND DEVICE FOR DEMODULATING RECEIVE SIGNAL INCLUDING A PILOT SIGNAL

FIELD OF INVENTION

This invention relates to a method and a device for demodulating a received signal including a pilot signal, and more particularly to, a method and a device for demodulating a received signal including a pilot signal while suppressing the bit error rate (BER) based on a unique word as a pilot signal in mobile satellite communications that incur fast fading on the transmission path.

BACKGROUND OF THE INVENTION

FIG. 1 shows a mobile terminal for mobile satellite communications. This mobile terminal is, for example, a portable telephone, which comprises an antenna 91, a signal converter 92, a demodulation circuit 93, a voice signal generator 94 and a speaker 95. The antenna 91 receives, through a satellite, a transmit signal as a continuous signal that has a unique word as a pilot signal in multiple sections. The signal converter 92 converts an analogue received signal into a digital signal. The demodulation circuit 93 demodulates a digital signal converted by the signal converter 92. The voice signal generator 94 converts digital demodulation signal from the demodulation signal 93 into an analogue voice signal. The speaker 95 performs the electrical—acoustical conversion of output of the voice signal generator 94, generating voice.

In the composition above, an analogue receive signal received by the antenna 91 is converted into a digital signal. The converted digital signal is demodulated by the demodulation circuit 93, and then the demodulated signal is converted into an analogue voice signal by the voice signal generator 94. The analogue voice signal converted by the voice signal generator 94 is output as voice from the speaker 95.

In the satellite communication system, for the purpose of reducing the consumed power and miniaturizing the antenna as well as retaining a low BER even under a low ratio of carrier power to noise power (Eb/NO), an error correction encoding with a large encoding gain, or a high-efficiency encoding technique is used.

FIG. 2 shows the composition of the demodulation circuit 93 in FIG. 1. The demodulation circuit 93 comprises a delay circuit 101 that receives the receive signal as an input, a data demodulator 102 that is connected to the delay circuit 101 and demodulates data, a unique word demodulator 103 that demodulates a unique word included in a received signal and a data distortion estimator 104 that includes a Wiener filter and that estimates the fading distortion of data in the received signal based on the fading distortion of the unique word. The demodulation circuit 93 is described in Meyr, "Digital Communication Receiver", John Wiley & Sons, pp.744–747, 1997. This circuit demodulates a received signal compensating a distortion (hereinafter referred to simply as 'fading distortion') of the received signal based on a flat fading in multi-path fading that includes a frequency selective fading with a frequency characteristic and a flat fading with no frequency characteristic.

FIG. 3 shows a format burst type transmit/receive signal different from the continuous signal communicated by the mobile terminal in FIG. 1. For example, one burst comprises multiple data (though data compose data sequence, herein referred to simply as 'data') D1 to D5 with multiple symbols and multiple unique words (though unique words compose unique-word sequence, herein referred to simply as 'unique word(s)') UWm (m=1 to 4) with multiple symbols, and is composed of 100 to 150 symbols as a whole. At four boundaries between data D1 and D5, unique words UWm as pilot signals are inserted. The unique word UWm has multiple symbols (in some cases, a single symbol) according to BER targeted, and the value of phase modulation of each symbol is known in the mobile terminal. The length (number of symbols) of unique words UW1 to UW4 is set so that it becomes minimum in the range that a certain error rate can be kept. This format signal is communicated using TDMA (time division multiple access). For example, each symbol is determined by phase-modulating (BPSK: binary phase shift keying) carrier wave with a phase of 0 and π according to binary data of 1 and −1.

In FIG. 2, a continuous-wave received signal with unique words UWm as pilot signals inserted at given intervals is input to an input terminal IN, then supplied to the delay circuit 101 and the unique word demodulator 103. Unique words UWm in the received signal are demodulated by the unique word demodulator 104, then input to the data distortion estimator 104. The unique word demodulator 104 estimates the fading distortion of each symbol of data D1 to D5 in the received signal based on the fading distortion of unique word UWm calculated from a known value of the unique word (for example, 0 by phase-demodulating +1, π by phase-demodulating −1) and a value of demodulated unique word UWm, then outputting it to the data demodulator 102. The data demodulator 102 demodulates data while compensating data in the received signal delayed for a given time by the delay circuit 101 using the estimation amount of fading distortion, and then the demodulated signal is output from an output terminal OUT. Thus, data can be demodulated compensating the fading distortion of data transmitted as a continuous wave.

FIG. 4 shows another demodulation circuit that can be used in place of the demodulation circuit 93 in FIG. 2. This circuit is described in S. Sanpei, "Compensation System of Fading Distortion of 16QAM for Overland Mobile Communications", Technical Report of IEICE B-11, Vol.J72-B-11, No.1, pp.7–15, 1989. It demodulates compensating the fading distortion of a continuous-wave received signal $$\hat{c}(k^-1), \hat{c}(k) \text{ and } \hat{c}(k^+1)$$

that one unique word symbol is inserted to every (N−1) information symbols. In FIG. 4, when a received signal is input to an input terminal IN, fading distortion estimators 111, 112 and 113 calculate the estimation values: of (k−1 th, kth and (k+1 th unique words in the received signal delayed sequentially. These estimation values are multiplied by a zero-order or first-order interpolation coefficient:

$$Q_1, Q_0, \text{ or } Q_{-1}$$

at multipliers 114, 115 and 116, then added by an adder 117. The adder 117 outputs, as the result of addition, c {k+(m/N)} that is the fading distortion of mth information symbol in kth information symbol sequence. The fading distortion of information symbol is brought into 1/c{k+(m/N)} by a reciprocal transformer 118, then output to a multiplier 120. The multiplier 120 multiplies information symbol in a received signal delayed by a delay circuit 119 by 1/c {k+(m/N)} output from the reciprocal transformer 118, thereby demodulating data, which is output from an output terminal OUT. Thus, the received signal can be demodulated compensating the envelope curve and phase of the received signal distorted with the fading distortion.

The demodulation device in FIG. 2 can demodulate a continuous-wave received signal that unique words are inserted into continuous data at given intervals, at a required BER. However, when it receives a burst signal with a frame format that unique words are inserted into several positions of a 100 to 150 symbol data sequence, since the fading distortion of a data sequence located at both ends is estimated using the fading distortion of the unique word only at one side, the estimation precision of the fading distortion of data at both ends reduces. Therefore, under the condition of fast fading or low Eb/NO ratio, a required BER cannot be obtained. For example, when Eb/NO=2 under the conditions of signal-to-fading intensity C/M=7 dB and Doppler frequency=0.01, a required BER corresponds to a deterioration of 0.5 dB from the theoretical value. Therefore, when the Wiener filter is replaced by a Kalman filter etc. with a higher estimation precision, the amount of operation increases since a matrix-like manner requiring a large amount of operation is necessary.

Also, in the demodulation device in FIG. 4, when using the zero-order interpolation coefficient, one value of a unique word is kept over the corresponding (N−1) information symbols, and when using the first-order interpolation coefficient, the fading distortion of information symbol is estimated by connecting between adjacent unique words with a straight line. Therefore, under the condition of fast fading or low Eb/NO ratio, a required BER cannot be obtained.

In order to enhance the estimation precision of fading distortion of data, it is, needless to say, necessary to increase the detection precision of fading distortion of a unique word. However, when the number of symbols for unique a word is increased for that purpose, the ratio of symbol number for data decreases relatively and therefore the efficiency of data transmission reduces.

SUMMARY OF THE INVENTION

Accordingly, it is an object of the invention to provide a method and a device for demodulating a received signal including a pilot signal that even when fast fading occurs on the transmission path, the fading distortion of data can be estimated at a high precision and a low BER can be obtained.

It is a further object of the invention to provide a method and a device for demodulating a received signal including a pilot signal that a low BER can be obtained compensating fast fading without reducing the ratio of symbol number for data in burst signal.

According to the invention, a method for demodulating a received signal including a pilot signal while estimating the fading distortion of data by detecting the fading distortion of a unique word as the pilot signal inserted into multiple sections of the received signal, comprises the steps of:

(1) setting part of data as an extended unique word;

(2) detecting the fading distortion of the unique word as the pilot signal as a first fading distortion and detecting the fading distortion of the extended unique word as a second fading distortion;

(3) estimating the fading distortion of data based on the first and second fading distortions; and (4) demodulating data based on the fading distortion of data.

According to another aspect of the invention, a method for demodulating a received signal including pilot signal while estimating the fading distortion of data by detecting the fading distortion of unique word as pilot signal inserted into multiple sections of a received signal, comprises the steps of:

(5) setting part of data adjacent to the unique word as a first extended unique word attached to the unique word;

(6) setting part of data that is apart from the unique word as a second extended unique word independent of the unique word;

(7) estimating the fading distortion of the first and second extended unique words;

(8) estimating the fading distortion of data in the received signal based on the fading distortion of the first and second extended unique words; and (9) demodulating data in the received signal based on the estimation result of fading distortion of data in the received signal.

According to another aspect of the invention, a method for demodulating a received signal including a pilot signal while estimating the fading distortion of data by detecting the fading distortion of a unique word as the pilot signal inserted into multiple sections of the received signal, comprises the steps of:

(10) detecting the first-stage fading distortion of the unique word in the multiple sections by comparing the unique word in the multiple sections with a known unique word;

(11) estimating the first-stage fading distortion of data in the received signal by conducting the first-stage MAP operation based on the first-stage fading distortion of unique word in the multiple sections;

(12) demodulating the received signal based on the first-stage fading distortion of data in the received signal and then outputting demodulated signal;

(13) comparing the demodulated signal with a predetermined threshold value and then outputting a binary signal as the comparison result;

(14) detecting the second-stage fading distortion of the unique word in the multiple sections by comparing the unique word in the multiple sections with a known unique word;

(15) detecting the fading distortion of part of data adjacent to the unique word in the multiple sections and part of data apart from the unique word in the multiple sections by comparing the part of data adjacent to and apart from the unique word in the multiple sections with the binary signal;

(16) estimating the second-stage fading distortion of data in the received signal by conducting the second-stage MAP operation based on the second-stage fading distortion of unique word in the multiple sections and the fading distortion of the part of data adjacent to and apart from the unique word in the multiple sections; and

(17) demodulating data in the received signal delayed for a predetermined time based on the second-stage fading distortion of data.

According to another aspect of the invention, a method for demodulating a received signal including a pilot signal while estimating the fading distortion of data by detecting the fading distortion of a unique word as the pilot signal inserted into multiple sections of the received signal, comprises the steps of:

(18) detecting the first-stage fading distortion of the unique word in the multiple sections by comparing the unique word in the multiple sections with a known unique word;

(19) calculating the first-stage spline interpolation curve based on the first-stage fading distortion of the unique word in the multiple sections and then estimating the first-stage fading distortion of data in the received signal from the first-stage spline interpolation curve;

(20) demodulating the received signal delayed for a predetermined time based on the first-stage fading distortion of data in the received signal and then outputting the demodulated signal;

(21) comparing the demodulated signal with a predetermined threshold value and then outputting a binary signal as the comparison result;

(22) detecting the second-stage fading distortion of the unique word in the multiple sections by comparing the unique word in the multiple sections of the a received signal delayed for a predetermined time with a known unique word;

(23) detecting the fading distortion of part of data adjacent to the unique word in the multiple sections and part of data apart from the unique word in the multiple sections by comparing the part of data adjacent to and apart from the unique word in the multiple sections with the binary signal;

(24) calculating the second-stage spline interpolation curve based on the second-stage fading distortion of the unique word in the multiple sections and the fading distortion of the part of data adjacent to and apart from the unique word in the multiple sections, and then estimating the second-stage first fading distortion of data in the received signal delayed for a predetermined time from the second-stage spline interpolation curve;

(25) inputting the second-stage fading distortion of the unique word in the multiple sections and the fading distortion of the part of data adjacent to and apart from the unique word in the multiple sections to a Wiener filter, thereby estimating the second-stage second fading distortion of data in the received signal delayed for a predetermined time; and

(26) demodulating data in the received signal delayed for a predetermined time based on the second-stage first and second fading distortions of data.

According to another aspect of the invention, a method for demodulating a received signal including a pilot signal while estimating the fading distortion of data by detecting the fading distortion of a unique word as the pilot signal inserted into multiple sections of the received signal, comprises the steps of:

(27) detecting the fading distortion of the unique word in the multiple sections by comparing the unique word in the multiple sections with a known unique word;

(28) calculating a MAP algorithm based on the fading distortion of the unique word in the multiple sections;

(29) estimating the fading distortion of data in the received signal from the calculation result of the MAP algorithm; and

(30) demodulating data in the received signal based on the fading distortion of data.

According to another aspect of the invention, a method for demodulating a received signal including a pilot signal while estimating the fading distortion of data by detecting the fading distortion of the unique word as the pilot signal inserted into multiple sections of the received signal, comprises the steps of:

(31) detecting the fading distortion of the unique word in the multiple sections as first fading distortion by comparing the unique word in the multiple sections of the received signal with a known unique word;

(32) calculating a first MAP algorithm based on the first fading distortion;

(33) estimating the fading distortion of data in the received signal as second fading distortion from the calculation result of the first MAP algorithm;

(34) demodulating data based on the second fading distortion;

(35) conducting the provisional hard decision of the demodulated data and then outputting a value of the provisional hard decision;

(36) detecting the fading distortion of the unique word in the multiple sections as third fading distortion by comparing the unique word in the multiple sections of the received signal with a known unique word;

(37) detecting the fading distortion of data in the received signal delayed for a predetermined time as fourth fading distortion by comparing the data with the value of the provisional hard decision;

(38) calculating a second MAP algorithm based on the third and fourth fading distortions;

(39) estimating the fading distortion of data in the received signal as fifth fading distortion from the calculation result of the second MAP algorithm; and

(40) demodulating the data in the received signal delayed for a predetermined time based on the fifth fading distortion.

According to another aspect of the invention, a method for demodulating a received signal including a pilot signal while estimating the fading distortion of data by detecting the fading distortion of a unique word as the pilot signal inserted into multiple sections of the received signal, comprises the steps of:

(41) estimating the first fading distortion of data based on the fading distortion of the unique word;

(42) demodulating the data based on the first fading distortion of data;

(43) detecting the fading distortion of an extended unique word from the fading distortion of the unique word and the fading distortion of the data obtained based on the demodulation result of the data;

(44) estimating the second fading distortion of the data based on the fading distortion of extended unique word;

(45) demodulating the data based on the second fading distortion of the data; and

(46) discontinuing the steps (43) to (45) according to the level of the first and second fading distortion of the data, then outputting the modulation result of the data at the step (42)

According to another aspect of the invention, a device for demodulating a received signal including a pilot signal while estimating the fading distortion of data by detecting the fading distortion of a unique word as the pilot signal inserted in to multiple sections of the received signal, comprises:

means for detecting the fading distortion of the unique word as first fading distortion and detecting the fading distortion of extended unique word set at part of the data as second fading distortion;

means for estimating the fading distortion of the data in the received signal based on the first and second fading distortions; and means for demodulating the data in the received signal based on the fading distortion of the data.

According to another aspect of the invention, a device for demodulating a received signal including a pilot signal while estimating the fading distortion of data by detecting the fading distortion of a unique word as the pilot signal inserted into multiple sections of the received signal, comprises:

means for detecting the fading distortion of the unique word in the multiple sections of the received signal by comparing a unique word in the multiple sections and a known unique word;

means for calculating a MAP algorithm based on the fading distortion of the unique word in the multiple sections, and estimating the fading distortion of data in the received signal from the calculation result; and means for demodulating data in the received signal based on the fading distortion of the data.

According to another aspect of the invention, a device for demodulating a received signal including a pilot signal while estimating the fading distortion of data by detecting the fading distortion of a unique word as the pilot signal inserted into multiple sections of the received signal, comprises:

a first detection means for detecting the fading distortion of the unique word in the multiple sections of the received signal as first fading distortion by comparing the unique word in the multiple sections and a known unique word;

a first calculation means for calculating a first MAP algorithm based on the first fading distortion;

a first estimation means for estimating the fading distortion of data in the received signal as second fading distortion from the calculation result of the first MAP algorithm;

a first demodulation means for demodulating data delayed for a predetermined time based on the second fading distortion;

a decision means for conducting the provisional hard decision of the demodulated data and then outputting a value of the provisional hard decision;

a second detection means for detecting the fading distortion of the unique word in the multiple sections of the received signal delayed for a predetermined time as third fading distortion by comparing the unique word in the multiple sections and a known unique word;

a second calculation means for calculating a second MAP algorithm based on the third and fourth fading distortions;

a second estimation means for estimating the fading distortion of data in the received signal as fifth fading distortion from the calculation result of the second MAP algorithm; and a second demodulation means for demodulating data delayed for a predetermined time based on the fifth fading distortion.

According to another aspect of the invention, a device for demodulating a received signal including a pilot signal while estimating the fading distortion of data by detecting the fading distortion of a unique word as the pilot signal inserted in to multiple sections of the received signal, comprises:

a first detection means for detecting the first-stage fading distortion of the unique word in the multiple sections of the received signal as first fading distortion by comparing a unique word in the multiple sections and a known unique word;

a first spline interpolation estimation means for calculating a first-stage spline interpolation curve based on the first-stage fading distortion of the unique word in the multiple sections, and estimating the first-stage fading distortion of data in the received signal from the first-stage spline interpolation curve;

a first demodulation means for demodulating the a received signal based on the first-stage fading distortion of data in the received signal and then outputting demodulated signal;

a decision means for comparing the demodulated signal with a predetermined threshold value and then outputting a binary signal;

a second detection means for detecting the second-stage fading distortion of the unique word in the multiple sections of the received signal by comparing a unique word in the multiple sections and a known unique word, and detecting the fading distortion of part of data adjacent to the unique word in the multiple sections and part of data apart from the unique word in the multiple sections by comparing part of data adjacent to and apart from the unique word with the binary data;

a second spline interpolation estimation means for calculating a second spline interpolation curve based on the output of the second detection means, and estimating the second-stage first fading distortion of data in the received signal from the second spline interpolation curve;

a Wiener filter means for being fed with the output of the second detection means and then estimating the second-stage second fading distortion of data in the received signal; and a second demodulation means for demodulating data in the received signal based on the second-stage first and second fading distortions of the data.

According to another aspect of the invention, a device for demodulating a received signal including a pilot signal while estimating the fading distortion of data by detecting the fading distortion of a unique word as the pilot signal inserted into multiple sections of the received signal, comprises:

a first estimation means for estimating the first fading distortion of data based on the fading distortion of the unique word;

a first demodulation means for outputting first demodulated signal of the data based on the first fading distortion of data;

a detection means for detecting the fading distortion of an extended unique word from the fading distortion of the unique word and the second fading distortion of the data estimated based on a value of the provisional hard decision of the demodulated signal of the data;

a second estimation means for estimating the second fading distortion of the data based on the fading distortion of the extended unique word;

a second demodulation means for outputting second demodulated signal of the data based on the second fading distortion of the data;

an output circuit for outputting the demodulated signal to a subsequent-stage circuit; and a control means for selectively connecting the first or second demodulation means to the output circuit according to the level of the first and second fading distortion of the data, for controlling the detection means, the second estimation means and second demodulation means not to operate when the first demodulation means is connected to the output circuit.

In the method and device for demodulating a received signal including a pilot signal of this invention, a transmit signal, e.g., a burst signal, that unique words as pilot signals are inserted into multiple sections is A/D-converted, and then the fading distortion of unique words in the multiple sections is detected by comparing the unique words in the received signal and known unique words. Then, based on the fading distortion of the unique words, a predetermined calculation is conducted, thereby the fading distortion of data in the received signal is estimated. The received signal is then demodulated based on this estimation value. The received signal demodulated is compared with a threshold value, e.g., zero, and is subject to the provisional hard decision to output binary signal of 1 or −1. The unique words of the received signal are compared again with known unique words, thereby the fading distortion of unique words is detected.

Simultaneously, data adjacent to the unique words and data apart from the unique words are compared with the binary signal obtained in the provisional hard decision, thereby the fading distortion of extended unique words is detected. Then, the fading distortion of unique words and the fading distortion of data adjacent to and apart from the unique words are averaged between multiple symbols. The average of fading distortion thus obtained is input to the calculation means. The calculation means estimates the fading distortion of data according to the fading distortion of the unique words. Using this fading distortion of data, data of the received signal is modulated.

BRIEF DESCRIPTION OF THE DRAWINGS

The invention will be explained in more detail in conjunction with the appended drawings, wherein.

DESCRIPTION OF THE PREFERRED EMBODIMENTS

A method and a device for demodulating a received signal including a pilot signal according to the invention are described in detail below.

Figure 5:
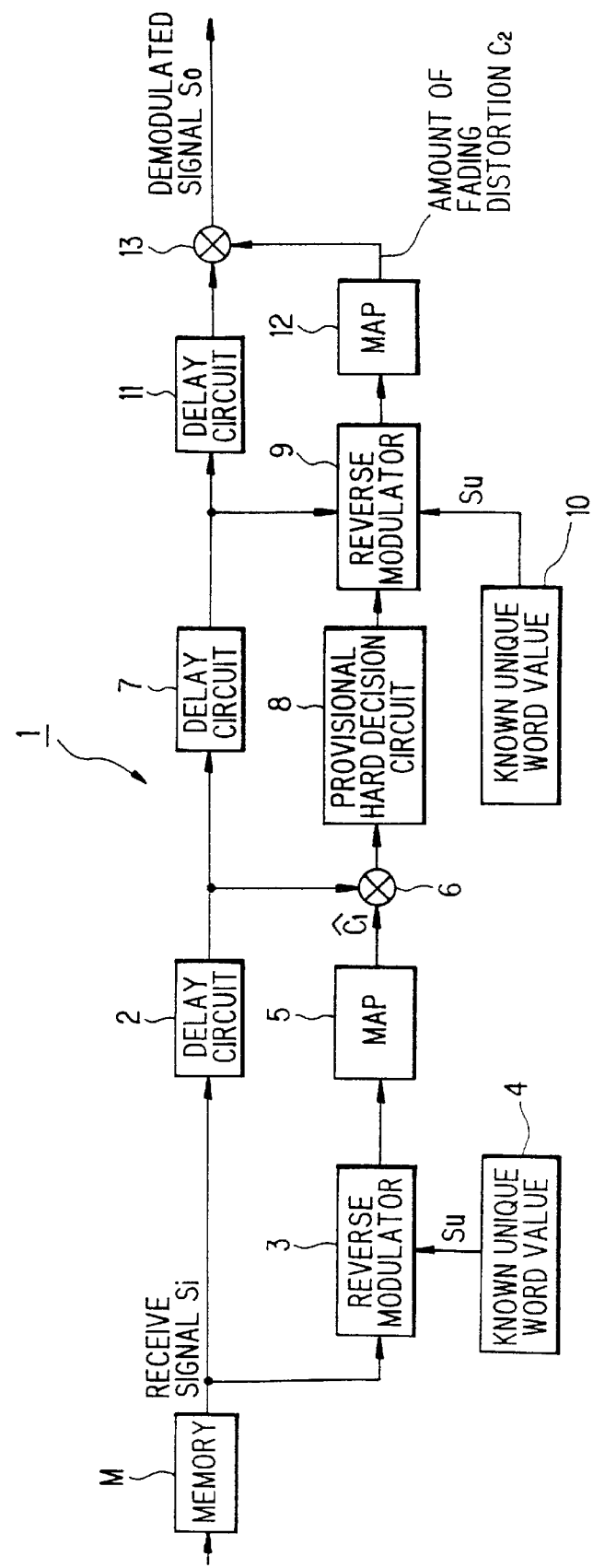
FIG. 5 is a block diagram showing a demodulation device in a first preferred embodiment according to the invention.

FIG. 5 shows a demodulation device in the first preferred embodiment according to the invention. The demodulation device 1 is, for example, applicable to a portable telephone as a mobile terminal for mobile satellite communications that burst signal is communicated. The demodulation device 1 comprises a memory M to store a received signal in units of a burst signal, a delay circuit 2 that delays a received signal Si read out from the memory M, a reverse modulator 3 that conducts the reverse modulation of a unique word of the received signal Si, a unique-word setting unit 4 that supplies a known unique word value Su to the reverse modulator 3, first operation unit (MAP) 5 that calculates the estimation amount f (k) of data fading from output of the reverse modulator 3 according to an operational expression described later, a first demodulator 6 that conducts the demodulation of the received signal Si based on output of the first operation unit 5 and output of the delay circuit 2, a delay circuit 7 that delays output of the delay circuit 2, a provisional hard decision circuit 8 that gives a provisional hard decision to output of the first demodulator 6, a reverse modulator 9 that detects the fading distortion of a unique word extended based on outputs of the delay circuit 7 and the provisional hard decision circuit 8, a unique-word setting unit 10 that supplies a known unique word value Su to the reverse modulator 9, a delay circuit 11 that delays output of the delay circuit 7, second operation unit (MAP) 12 that calculates the estimation amount of data fading from output of the reverse modulator 9, and a second demodulator 13 that demodulates the received signal Si based on outputs of the delay circuit 11 and the second operation unit 12 and that outputs demodulation signal So. The delay circuit 2 delays the received signal Si for a time required for signal processing in the reverse modulator 3 and the first operation unit 5. Similarly, the delay circuits 7, 11 delay a received signal Si for a time required for signal processing in the respective circuits disposed in parallel.

In the demodulation device 1, for kth symbol of a burst signal with symbol number N, given that a received signal is r (k), transmit signal is s (k), fading distortion component is f (k) and noise component is n (k), the next equation (3) is established.

$$r(k)=f(k)s(k)+n(k) \quad (3)$$

The first and second operation units 5, 12 are described in Meyr, "Digital communication Receiver", John Wiley & Sons, pp.744–747, 1997. The estimation value:

$$\hat{c}_k$$

of the fading distortion of kth symbol data of burst signal is estimated by a MAP algorithm in equation (5) below.

$$\hat{c}_k = r_k^H \cdot (R_D + N_0)^{-1} \cdot a_T$$

$$R_D = \begin{bmatrix} \alpha(p_0-p_0) & \alpha(p_0-p_1) & \cdots & \alpha(p_0-p_{n-1}) \\ \alpha(p_1-p_0) & \alpha(p_1-p_1) & \cdots & \alpha(p_1-p_{n-1}) \\ \vdots & \vdots & \ddots & \vdots \\ \alpha(p_{n-1}-p_0) & \alpha(p_{n-1}-p_1) & \cdots & \alpha(p_{n-1}-p_{n-1}) \end{bmatrix}$$

$$r_k^H = (\alpha(k-p_0)\alpha(k-p_1)\ldots\alpha(k-p_{n-1})) \quad (5)$$

where $$\alpha(x) = \frac{\sin(2\pi\lambda x)}{2\pi\lambda x}$$

and R,N indicate covariance matrices, λ indicates Doppler frequency, rk indicates correlation between kth symbol and respective unique words, a indicates a vector of reverse-modulated unique word, and $p_0$ to $P_{n-1}$ indicate positions of unique words in burst signal.

Equation (7) below indicates input signal a(k) of the provisional hard decision circuit 8, and equation (8) below indicates output signal a' (k) of the provisional hard decision circuit 8.

$$a(k) = \frac{r(k)}{c_1(k)} = \frac{f(k)\cdot s(k)}{c_1(k)} + \frac{n(k)}{c_1(k)} \quad (7)$$

Figure 1:
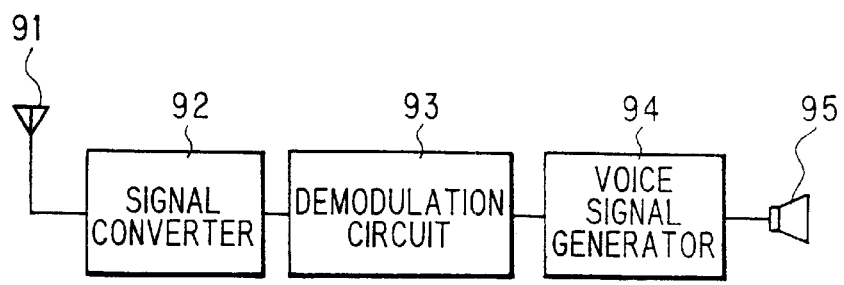
FIG. 1 is a block diagram showing an example of a conventional mobile terminal for mobile satellite communication.
Figure 2:
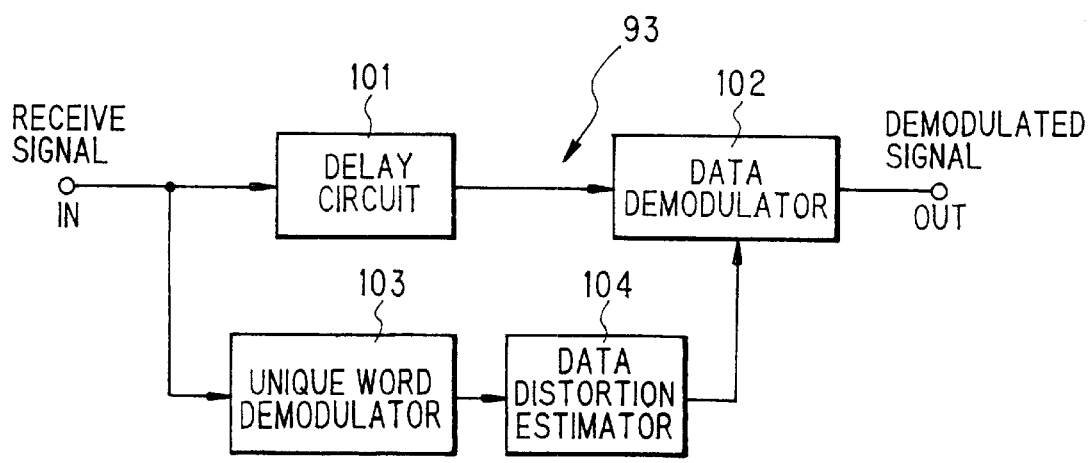
FIG. 2 is a block diagram showing an example of the detailed composition of a demodulation circuit 93 in FIG. 1.
Figure 3:
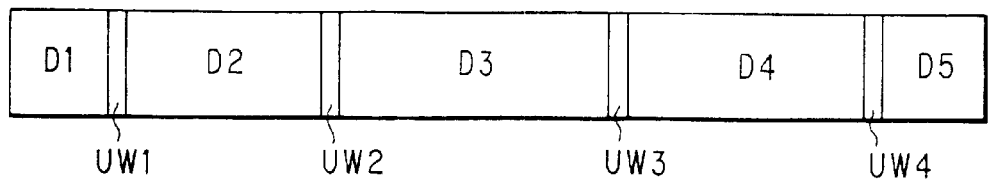
FIG. 3 is an illustration showing a frame format of a burst type transmit/receive signal.
Figure 4:
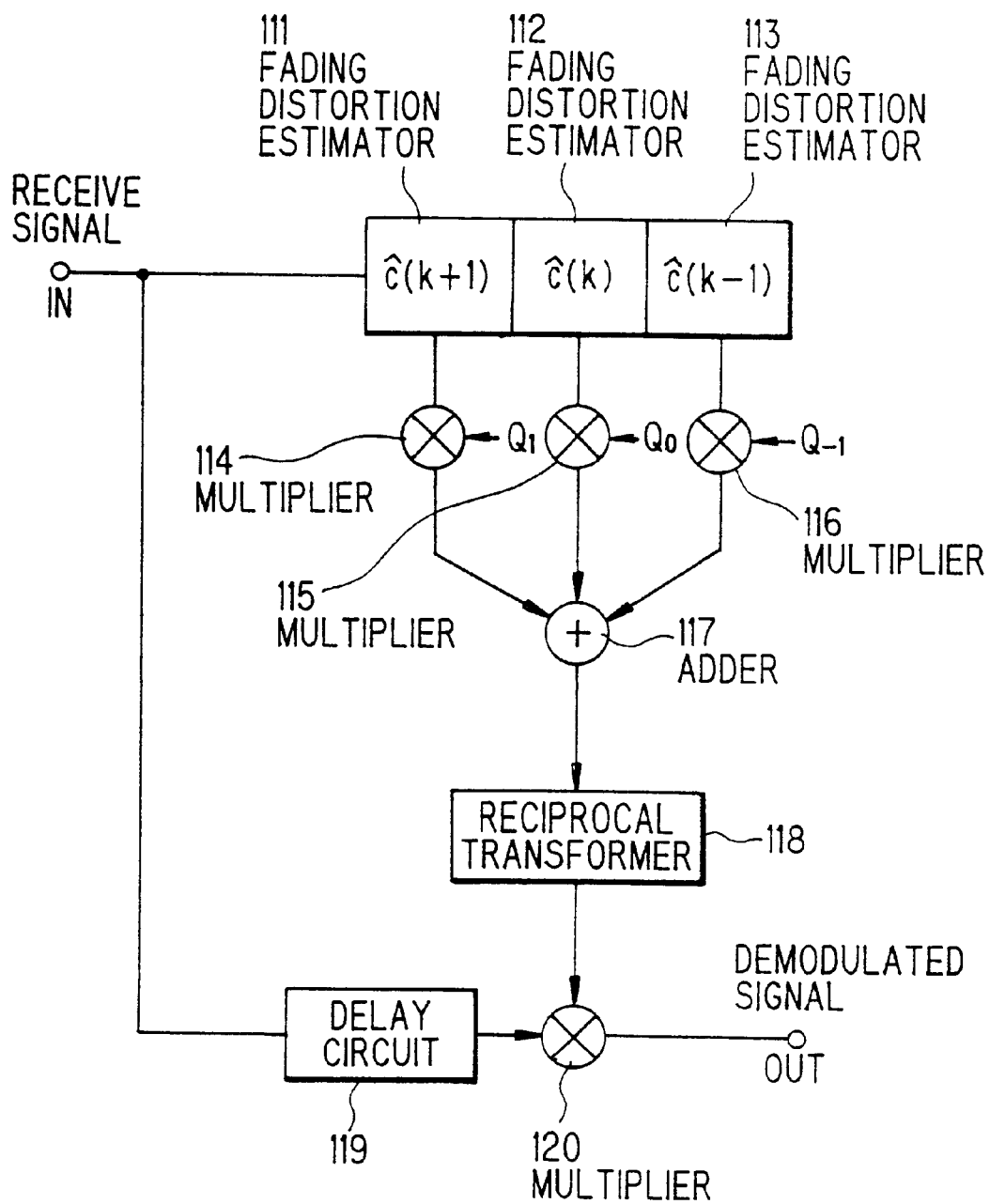
FIG. 4 is a block diagram showing another example of the detailed composition of the demodulation circuit 93 in FIG. 1.
Figure 6:
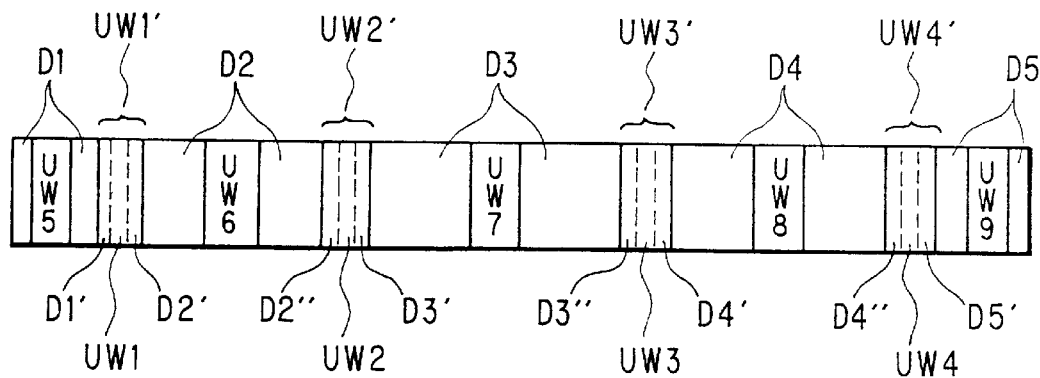
FIG. 6 is an illustration showing a frame format that unique words are extended by a reverse modulator 9 in FIG. 5.

FIG. 6 shows the result that unique words are extended in the reverse modulator 9 being fed with the judgement result of the provisional hard decision circuit 8. In comparison with FIG. 3, this invention is, at first, characterized in that unique words UW1 to UW4 are extended to its adjacent data region to form first extended unique words UW1' to UW4', and is, secondly, characterized in that second extended unique words UW5 to UW9 are provided at part (in this example, central position of each of data D1 to D5) of each of data D1 to D5 apart from unique words UW1 to UW4. The extended unique word UW1' is composed of UW1+data D1'+data D2', the extended unique word UW2' is composed of UW2+data D2"+data D3', the extended unique word UW3' is composed of UW3+data D3"+data D4', and the extended unique word UW4' is composed of UW4+data D4"+data D5'. Since the number of symbols of extended unique word increases, the amount of information increases, and therefore, even when fast flat fading occurs, the fading distortion can be estimated at a high precision. So, the precision of demodulation of the received signal Si can be enhanced. Also, since part of data is regarded as a unique word, the efficiency of data transmission does not reduce.

$$r(k)\cdot\exp\{-j\cdot\theta_2(k)\} \quad (9)$$

Expression (9) indicates the result of demodulation of the second demodulator 13. Phase $\theta_2$ corresponds to the estimation value $c_2(k)$ of fading distortion calculated by the second operation unit 12.

Next, the operation of the demodulation device 1 in FIG. 5 is explained.

Here, assumed is a burst signal that is modulated by BPSK and is affected by flat fading on the propagation path. With the flat fading, the phase and amplitude of signal varies. So, in demodulation, it is necessary to estimate the fading distortion of data. Herein, the estimation amount of fading is referred to as "channel estimation amount".

In demodulation, one-burst received signal Si [r (k) ] is stored into memory M. If the number of one-burst symbols is N, in the first-stage channel estimation, given that receive data of kth symbol is r (k), transmit signal corresponding to this received signal is s (k), fading distortion component is f (k), and noise component is n (K), then receive data r (k) is given by equation (3) described earlier.

Transmit signals to unique words UW1 to UW4 are known at the reception side. By reverse-modulating them based on known signal Su [s (k)] of unique words UW1 to UW4 supplied from the UW setting unit 4 by the reverse modulator 3, the fading distortion component f (k) for the unique words UW1 to UW4 can be calculated. For each unique word UWm, the fading distortions of multiple symbols are averaged. Hereupon, the fading distortion r (k)/s (k) includes n (k)/s (k) as an error. However, when each unique word UWm has multiple symbols, by averaging the error between the multiple symbols, the average value of noise complies with the gaussian distribution. Therefore, that affection is compressed, thereby the detection precision can be prevented from lowering.

Then, the fading distortion of unique word UWm detected by the reverse modulator 3 is input to the first operation unit 5, where the operation shown in equation (5) is conducted according to the MAP algorithm and the estimation output:

$\hat{c}_1(k)$ of data fading distortion is calculated.

The estimation amount:

$\hat{c}_1(k)$ of data fading by the first operation unit 5 is sent to the first demodulator 6. The first demodulator 6 calculates a demodulation output a(k) in equation (7) based on receive data r(k) output delayed by the delay circuit 2 in exact timing with this and the fading estimation amount: $\hat{c}_1(k)$ This demodulation output a(k) is subject to two-valued determination by the provisional hard decision circuit 8. The provisional hard decision circuit 8 compares demodulation signal of parts (parts of data D1', D2', D2", D3', D3", D4', D4" and D5') adjacent to the original unique words UW1 to UW4 and parts UW5 to UW9 apart from the original unique words UW1 to UW4 (in the latter stage, data of these parts are regarded as unique words) with a threshold value of zero, then outputting a decision result a' (k) of +1 or −1 according to equation (8).

The decision result of the provisional hard decision circuit 8 is input to the reverse modulator 9. The reverse modulator 9 conducts the reverse modulation based on +1 and −1 obtained by the provisional hard decision circuit 8, receive data r (k) from the delay circuit 7 and known unique word values Su [s (k) ] from the UW setting unit 10, detecting the fading distortion of unique word. Namely, for the original unique words UW1 to UW4, the reverse modulation is conducted based on output Su[s (k) ] of the UW setting unit 10. For the extended unique words UW5 to UW9 and data (D1' to D5', D2" to D4") adjacent to the unique words UW1 to UW4, the reverse modulation is conducted based on output +1, −1 of the provisional hard decision circuit 8. The fading distortion of the first extended unique word UW1' to UW4' is averaged between multiple symbols (combination of original unique word symbol and data symbols that are also regarded as unique words), and the average values are used as the fading distortion of the first extended unique words UW1' to Uw4'. Also, for the second extended unique word UW5 to UW9, the average values are calculated between multiple symbols (data symbols that are also regarded as unique words), output to the second operation unit 12 as the fading distortion of the second extended unique words UW5 to Uw9. The second operation unit 12 calculates the estimation value of fading distortion:

$\hat{c}_2(k)$ for data D1 to D5 based on the fading distortion of the first and second extended unique words UW1' to UW4' and UW5 to UW9 according to the MAP algorithm. According to this estimation value of fading distortion, the second demodulator 13 demodulates data D1 to D5 in the received signal from the delay circuit 11, outputting demodulation signal So.

As described above, by detecting the fading distortion of the first extended unique words UW1' to UW4' that include the unique words UW1 to UW4 and data adjacent to them and the second extended unique words UW5 to UW9 provided in data D1 to D5, the high-precision estimation of data fading distortion can be realized. Also, by using the MAP algorithm for the estimation of the fading distortion, the precision of estimation can be enhanced.

Figure 7:
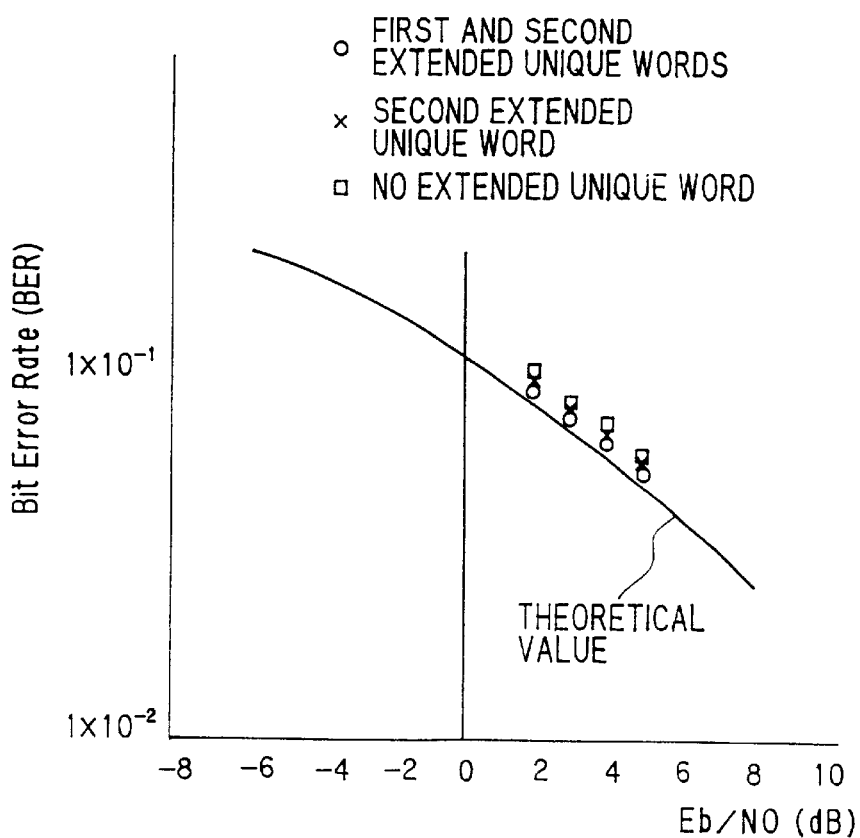
FIG. 7 is a graph showing that extended unique words effect a lowering of BER.

FIG. 7 shows the result that, under the conditions of signal-to-fading intensity C/M=7 dB and Doppler frequency=0.01, the effect of setting the first extended unique words UW1' to UW4' and the second extended unique words UW5 to UW9 in FIG. 6 is tested. Plotting by mark "O" indicates BER when both the first extended unique words UW1' to UW4' and the second extended unique words UW5 to UW9 are set. Plotting by mark "X" indicates BER when only the second extended unique words UW5 to UW9 are set. Plotting by mark "□" indicates BER when no extended unique word is set and the original unique words UW1 to UW4 are provided. As seen from this result, BER can be approximated to its theoretical value by setting the first extended unique words UW1' to UW4' and/or the second extended unique words UW5 to UW9.

This invention is not limited to the above embodiment. For example, it can be applied to a device for receiving another digital-phase-modulated signal such as QPSK, and can be applied to TDMA(time division multiple access), CDMA (code division multiple access) etc.

Figure 8:
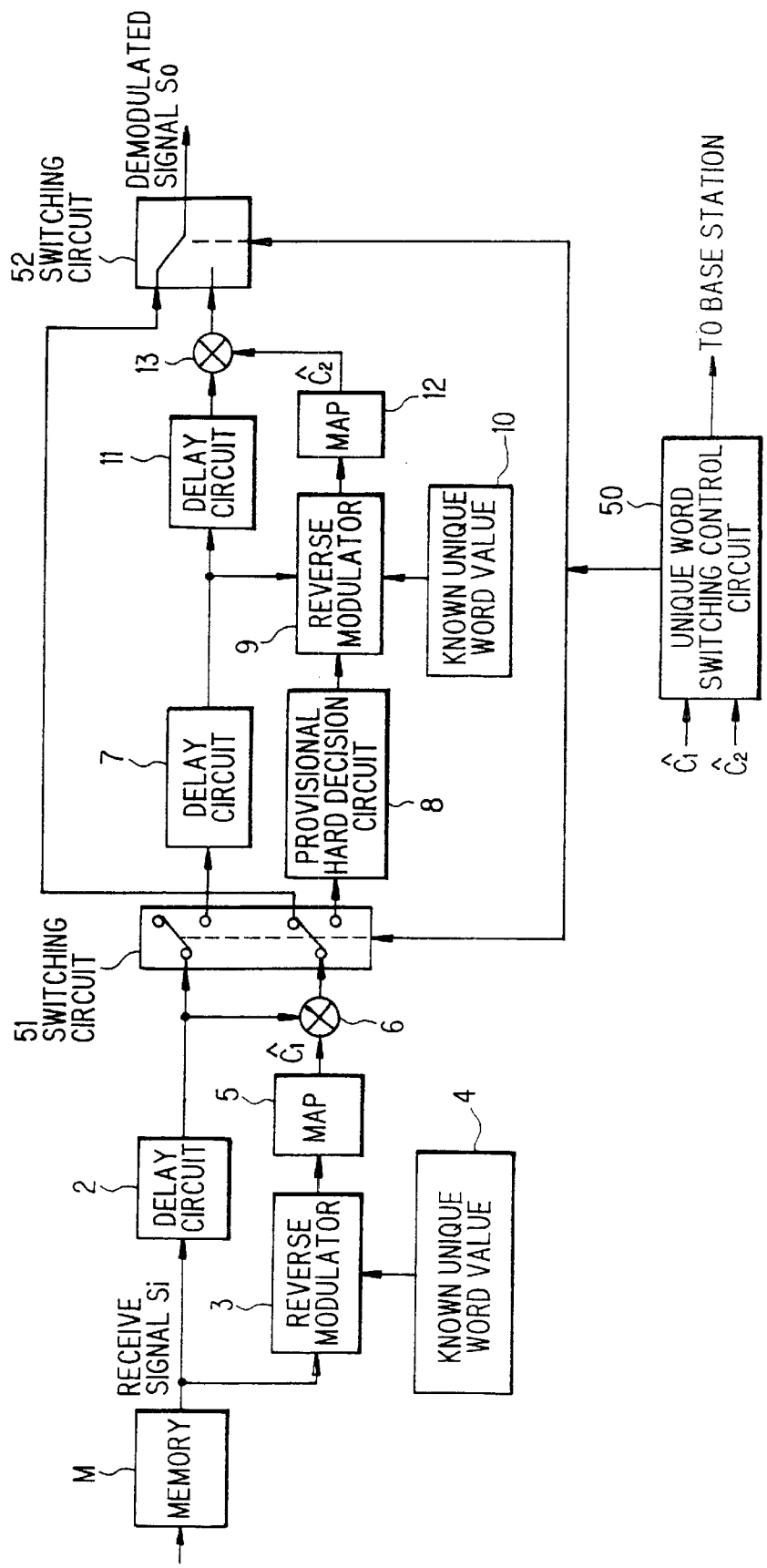
FIG. 8 is a block diagram showing a demodulation device in a second preferred embodiment according to the invention.

FIG. 8 shows a demodulation device for demodulating a received signal including a pilot signal in the second preferred embodiment according to the invention. In FIG. 8 like parts are indicated by like reference numerals as used in FIG. 5, and the repetitive explanations thereof are omitted. In this embodiment, a unique word switching control circuit 50 and switching circuits 51, 52 are added.

In the above composition, when either or both of the estimation values:

$\hat{c}_1(k), \hat{c}_2(k)$ of data fading distortion output from the operation circuits 5, 12 are smaller than a first predetermined value, the control circuit 50 controls the switching circuits 51, 52 to connect as shown in FIG. 8. As a result, the output of the first demodulator 6 is output as demodulation signal So. Thus, the setting of the first and second extended unique words does not occur and the fading distortion of data is estimated from only the original unique words UW1 to UW4.

Next, when either or both of the estimation values:

$\hat{c}_1(k), \hat{c}_2(k)$ of data fading distortion output from the operation circuits 5, 12 are smaller than a second predetermined value that is set smaller than the first predetermined value, the control circuit 50 controls the switching circuits 51, 52 to connect as shown in FIG. 8, and instructs a base station to reduce the unique words UW1 to UW4 using one symbol in a burst signal. As a result, the unique words UW2 to UW4 are deleted and only the unique word UW1 is set at the top or center of the burst signal.

On the other hand, when either or both of the estimation values:

$\hat{c}_1(k), \hat{c}_2(k)$ of data fading distortion output from the operation circuits 5, 12 are greater than the first predetermined value, the control circuit 50 controls the switching circuits 51, 52 to connect as shown in FIG. 5. As a result, like the first embodiment, the first and second extended unique words are set.

Of the three control modes described above, the first control mode can help simplify the composition of demodulation device and can prevent the delay time in processing from increasing. The second control mode can increase the efficiency of data transmission in addition to the effects of the first control mode. The third control mode, where part of data is regarded as unique words, can compensate the fading distortion at a high precision while preventing the efficiency of data transmission from reducing.

Figure 9:
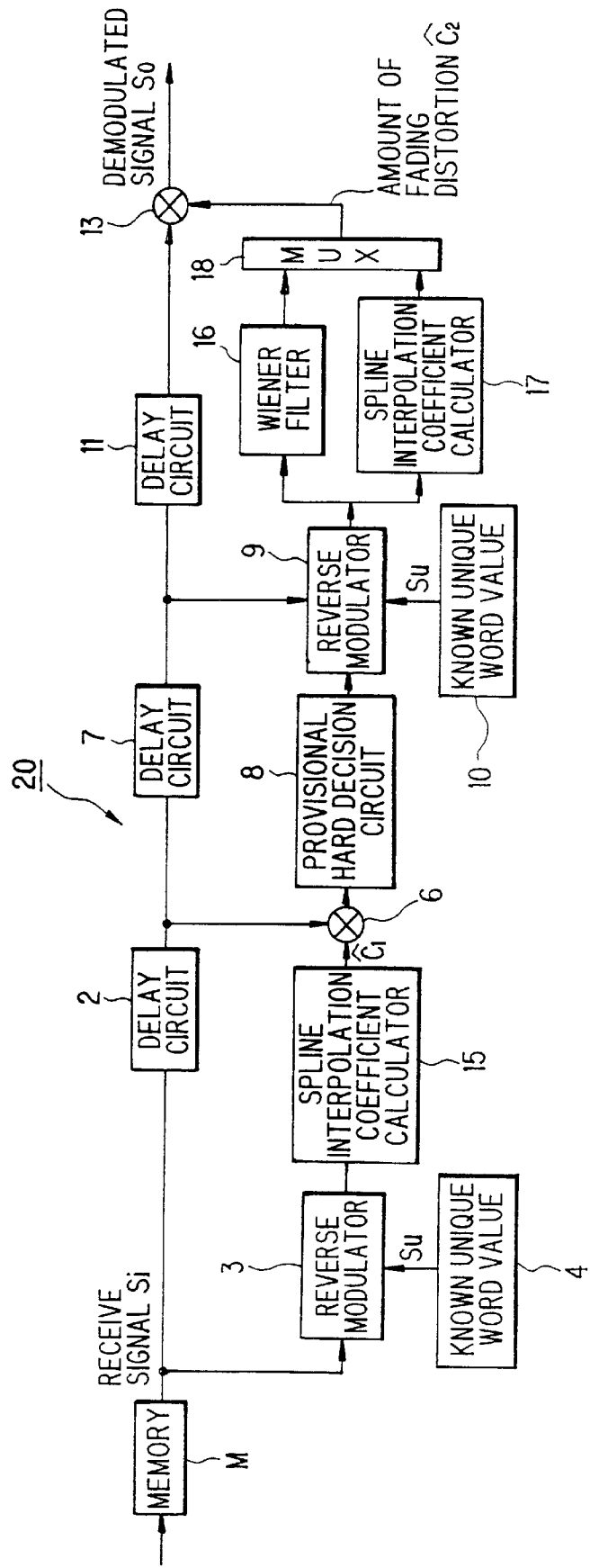
FIG. 9 is a block diagram showing a demodulation device in a third preferred embodiment according to the invention.

FIG. 9 shows a demodulation device for demodulating a received signal including a pilot signal in the third preferred embodiment according to the invention. In FIG. 9 like parts are indicated by like reference numerals as used in FIG. 5, and the repetitive explanations thereof are omitted.

This demodulation device is composed of a spline interpolation coefficient calculator 15 that substitutes for the first operation unit 15 in FIG. 5, and a Wiener filter 16, a spline interpolation coefficient calculator 17 and a signal mixer (MUX) 18 that substitute for the second operation unit 12 in FIG. 5.

The spline interpolation coefficient calculator 15 estimates the fading distortion of data D1 to D5 based on the fading distortion of unique words UW1 to UW4 from the reverse modulator 3. The Wiener filter 16 estimates the fading distortion of inner data (data D2 to D4 in FIG. 6) based on the fading distortion of the first extended unique words UW1' to UW4' from the reverse modulator 9 and the second extended unique words UW5 to UW9 set inside data. The spline interpolation coefficient calculator 17 estimates the fading distortion of outer data (data D1 and D5 in FIG. 6) based on the fading distortion of the first and second extended unique words UW1' to UW4' and UW5 to UW9 from the reverse modulator 9. The signal mixer (MUX) 18 mixes the data fading distortion from the Wiener filter 16 and the spline interpolation coefficient calculator 17. The signal mixer 18 is connected to the demodulator 13, which demodulates the received signal by the data fading distortion from the signal mixer 18.

Figure 10:
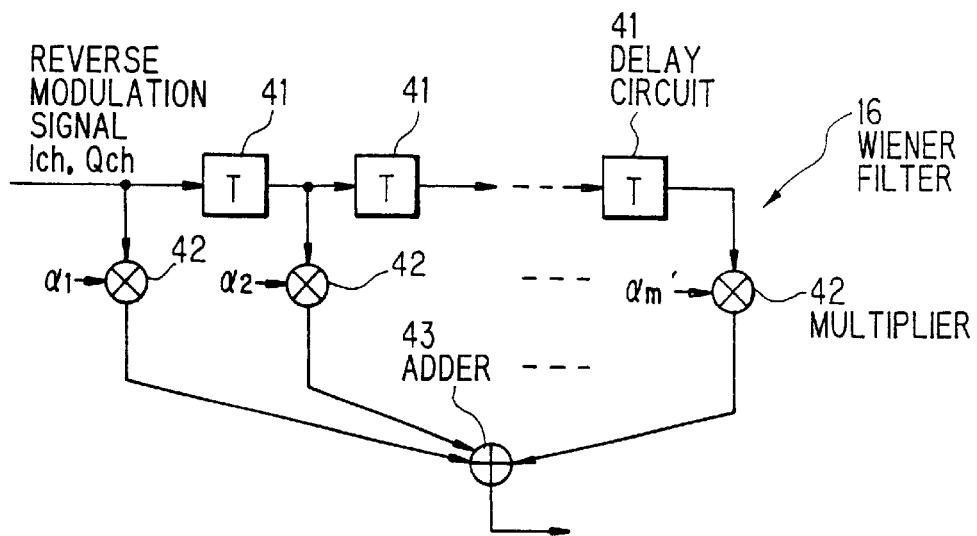
FIG. 10 is a block diagram showing the detailed composition of a Wiener filter 16 in FIG. 9.

FIG. 10 shows an example of composition of the Wiener filter 16. The Wiener filter 16 is a transversal type filter, and is composed of (m'−1) delay circuits 41, m' multipliers 42, and an adder 43 that adds the multiplication result of the multipliers 42. Here, m' corresponds to the setting number (M'=9) of the first and second extended unique words in FIG. 6. In the Wiener filter 16, the fading distortions of the first and second extended unique words detected by the reverse modulator 9 are delayed sequentially by the delay circuits 41, and then the fading distortions of the first and second extended unique words are simultaneously input to the multipliers 42, which calculate tap coefficients $\alpha 1, \alpha 2, \ldots, \alpha m'$, respectively. The calculation method of the tap coefficients $\alpha 1, \alpha 2, \ldots, \alpha m'$ explained later.

In the Wiener filter 16, given that Doppler frequency of fading distortion is $\lambda$, the tap coefficient $\alpha i$ of ith multiplier 42 to kth symbol is given by:

$$\alpha i = \sin(x)/x, \quad x + 2\pi\lambda(i-k) \tag{17}$$

Figure 11:
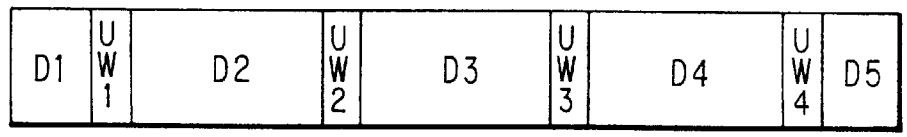
FIG. 11 is an illustration showing the process of calculating a spline interpolation curve in a spline interpolation coefficient calculator 15 in FIG. 9.
Figure 11:
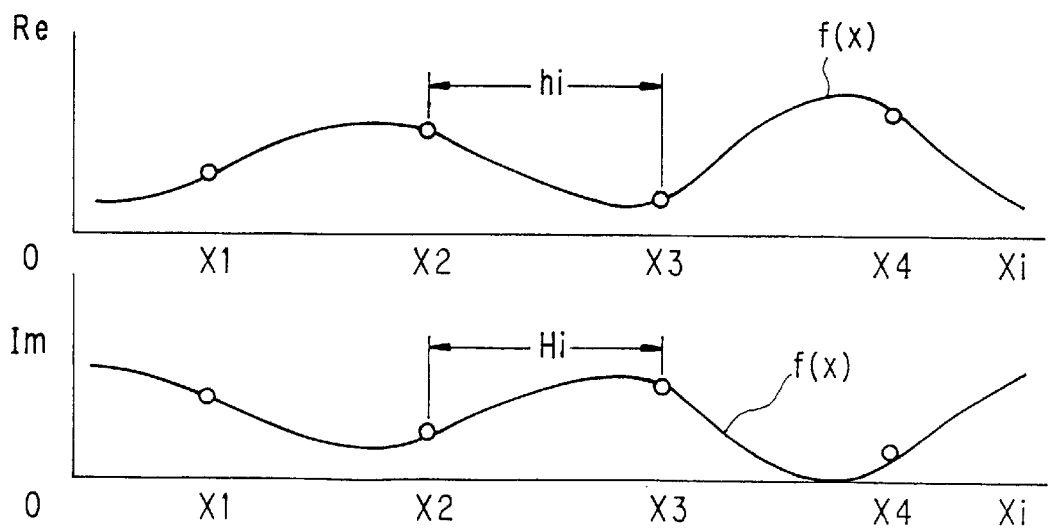

FIG. 11 shows the process that the spline interpolation coefficient calculator 15 calculates a spline interpolation curve. Here, the original unique words UW1 to UW4 unextended are explained taken as an example. The symbol numbers of UW1 to UW4 are defined as X1 to X4, respectively, and a function value corresponding to each Xi (i=1, 2, 3, 4) based on the fading distortion of unique word UWm detected by the reverse modulator 3 is defined as Yi=F(Xi). When each unique word UWm has multiple symbols, they can be regarded as one point by averaging the multiple symbols in each unique word UWm. The approximate function passing through these four points is defined as f (x). This has continuous first derivative (indicated by sign ['] in expression) and second derivative (indicated by sign ["] in expression), and is made to satisfy f (x)=F (Xi) as described later. The function value F (Xi) is represented by real part 'Re' and imaginary part 'Im'.

Provided that, for example, in section Ii{Xi, X(i+1)} that has two adjacent end points, f (x) corresponds to, e.g., a cubic polynomial equation Pi(x) and hi=X(i+1) −X is satisfied, the spline interpolation function Pi(x) is represented by:

$$Pi(x)=Pi''(Xi)\{X(i+1)-x\}^3/6hi+Pi''\{X(i+1)\}\{x-Xi\}^3/6hi+\{Y(i+1)/hi-hiPi''(Xi+1)/6\}(x-Xi)+\{Yi/hi-hiPi''(Xi)/6\}\{X(i+1)-x\} \quad (18).$$

The spline interpolation function Pi(x) is, for example, described in 'ACOS Software Numerical Calculation Library Manual (7th Version), NEC Corp., pp.78, 1985. As described above, in order to satisfy f(x)=F(Xi), cubic polynomial equations at both sides of point X2 of real part Re in FIG. 11 are assumed as:

$$f(x)=a_1x^3+b_1x^2+c_1x+d_1, \text{ and}$$

$$f(x)=a_2x^3+b_2x^2+c_2x+d_2$$

Then the respective coefficients:

$a_1, b_1, c_1, d_1, a_2, b_2, c_2$ and $d_2$ are calculated so that the second derivative values of both f (x) become equal based on the above-mentioned ACOS software, thereby f (x) for each section Ii is determined. Of course, the spline interpolation function is not limited to cubic polynomial equation, and may be quartic or higher. The precision of estimation increases with the order of equation, while the amount of operation increases therewith.

Figure 12:
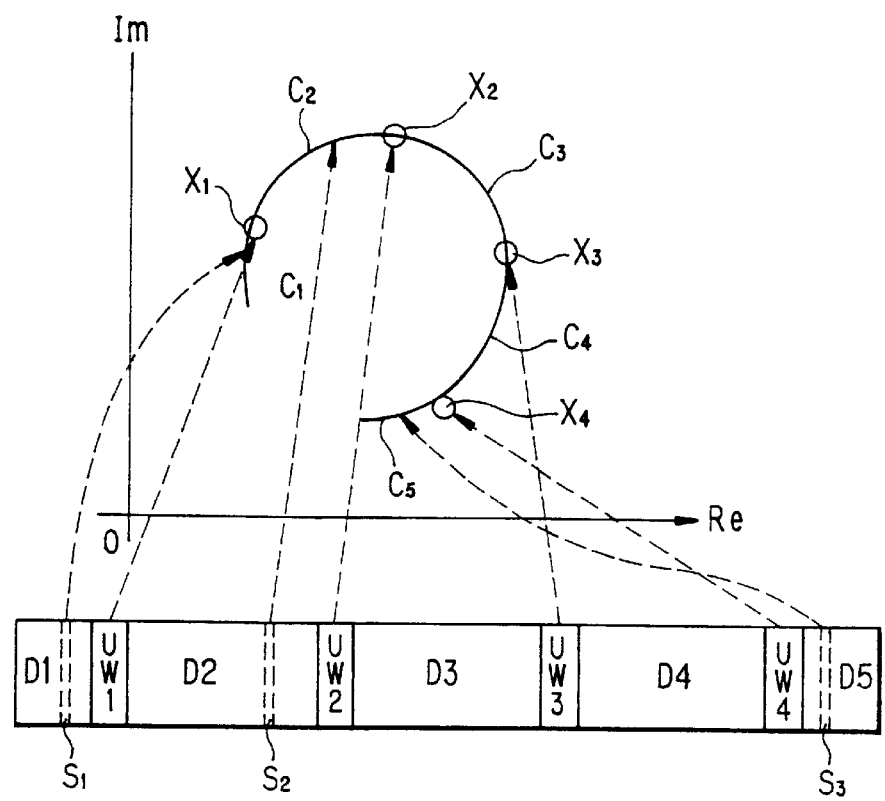
FIG. 12 is an illustration showing Pi(x) calculated from two approximate functions f(x) for real part Re and imaginary part Im in FIG. 11.

FIG. 12 is an illustration showing Pi (x) calculated from two approximate functions f (x) for real part Re and imaginary part Im in FIG. 11. Using spline interpolation curves C, to $C_5$ passing through points X1 to X4 that the fading distortion of each unique word UWm is plotted, the fading distortion of the corresponding data D1 to D5 is estimated. For example, the fading distortion of symbol S1 is estimated from curve $C_1$, the fading distortion of symbol S2 is estimated from curve $C_2$, and the fading distortion of symbol S3 is estimated from curve $C_5$. Also in the spline interpolation coefficient calculator 17, the estimation of data fading distortion is conducted like the spline interpolation coefficient calculator. However, in the spline interpolation coefficient calculator 17, since plotted point increases with the setting number of the first and second extended unique words, the precision of estimation can be enhanced.

Figure 13:
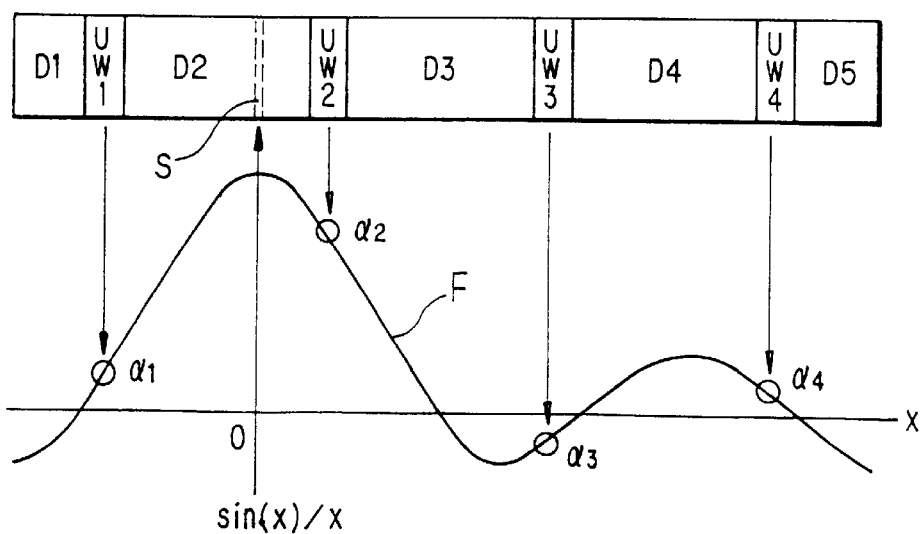
FIG. 13 is an illustration showing the process of calculating the tap coefficients α1 to α4 of a Wiener filter 16 in FIG. 9 corresponding to symbol S of data D2 based on curve F of sin(x)/x.

FIG. 13 shows the process of calculating the tap coefficients $\alpha1$ to $\alpha4$ of the Wiener filter 16 corresponding to symbol S of data D2 based on curve F of sin(x)/x. Here, the lateral axis x indicates a distance according to the number of symbols when the position of symbol S whose tap coefficient to be calculated is set to be zero. Aligning the maximum value of curve F to zero position, the values of curve F corresponding to the positions of unique words UWm on the x axis give the tap coefficients and are supplied to the multipliers 42 of the Wiener filter 16.

Also in the third embodiment in FIG. 9, like the first embodiment, for kth symbol, given that a received signal is r (k), transmit signal is s (k), a received signal r (k) is, using fading distortion component f (k) and noise component n (k), represented by:

$$r(k)=f(k)s(k)+n(k) \quad (21)$$

like equation (3).

Since transmit signal s (k) to each unique word UWm is known at the reception side, from the ratio of a received signal r (k) with modulation component removed by reverse-modulating it by the reverse modulator 3 and transmit signal s(k), the fading distortion of the unique word UWm can be calculated. Namely, equation:

$$r(k)/s(k)=f(k)+n(k)/s(k) \quad (22)$$

is calculated. Hereupon, the fading distortion r(k)/s(k) includes n(k)/s(k) as an error. However, when each unique word UWm has multiple symbols, by averaging the error between the multiple symbols, the average value of noise complies with the gaussian distribution. Therefore, that affection is compressed, thereby the detection precision can be prevented from lowering. When a unique word UWm has multiple symbols, the average is calculated by the reverse modulator 3. The demodulator 6 divides a received signal r (k) by the estimation value of data fading distortion:

$\hat{c}_1(k)$ and calculates input a(k) to the provisional hard decision circuit 8 according to equation below.

$$a(k)=r(k)/\hat{c}_1(k)=f(k)s(k)/\hat{c}_1(k)+n(k)/\hat{c}_1(k) \quad (24)$$

The output a' (k) of the provisional hard decision circuit 8 becomes +1 or −1 being compared with a threshold value of zero. The output a' (k) is represented by:

$$A'(k)=[1:\text{Re}\{a(k)\}>0, -1:\text{Re}\{a(k)\}<0] \quad (25)$$

like equation (8)

The reverse modulator 9 detects the fading distortion of the first extended unique words UW1' to UW4' that includes the original unique words UW1 to UW4 and the adjacent data (D1', D2', D2", D3', D3", D4', D4" and D5') and the second extended unique words UW5 to UW9 set inside each data, calculating the average between multiple symbols of each unique word UWm, outputting it as the fading distortion of the first and second extended unique words UW1' to UW4' and UW5 to UW9 to the Wiener filter 16 and the spline interpolation coefficient calculator 17. The Wiener filter 16 detects the data fading distortion as to central (inner) part (data D2 to D4 in FIG. 6) of burst signal. The estimation value:

$\hat{c}_2(k)$ of fading distortion of kth symbol is represented by equation (27) using the tap coefficient αi in FIG. 12.

$$\hat{c}_2(k)=\Sigma\alpha i \cdot r(i)/a'(i) \quad (27)$$

where i=1 to N and N is the number of symbols in burst signal. Thus, output $\theta_2(k)$ of the Wiener filter 16 is represented by:

$$\theta_2 k = \text{Arctan}\{Im(\hat{c}_2(k))/\text{Re}(\hat{c}_2(k))\} \quad (28)$$

Next, the estimation of fading distortion to both ends (data D1, D5 in FIG. 6) of burst signal by the spline interpolation coefficient calculator 17 is explained.

As shown in FIG. 6, the first extended unique words UW1' to UW4' are formed by regarding part of data symbol at both sides of the original unique words UW1 to UW4 as a part of the original unique words UW1 to UW4. For the original unique words UWm, the fading distortion is calculated based on the ratio of a received signal and a known value Su [s(k)] from the UW setting unit 10. For the remaining part D1' to D5' and D2" to D4" of the first extended unique words UWm' and the second extended unique words UW5 to UW9, the fading distortion is calculated based on the ratio of the received signal and a binary value from the provisional hard decision circuit 8. In the first and second extended unique words, each unique word is made to be one point by calculating the average between multiple symbols and these points are plotted in as shown in FIGS. 11 and 12, the estimation value:

$\hat{c}_2(k)$ of fading distortion of data D1, D5 is calculated.

Then, phase angle $\theta_2$ is calculated by:

$$\theta_2 k = \text{Arctan}\{Im(\hat{c}_2(k))/Re(\hat{c}_2(k))\} \tag{30}$$

From these results, the second demodulator 13 demodulates receive data from the delay circuit 11 according to expression (31) and then outputs demodulation signal So.

$$r(k) \cdot \exp\{-j \cdot \theta_2(k)\} \tag{31}$$

Figure 14:
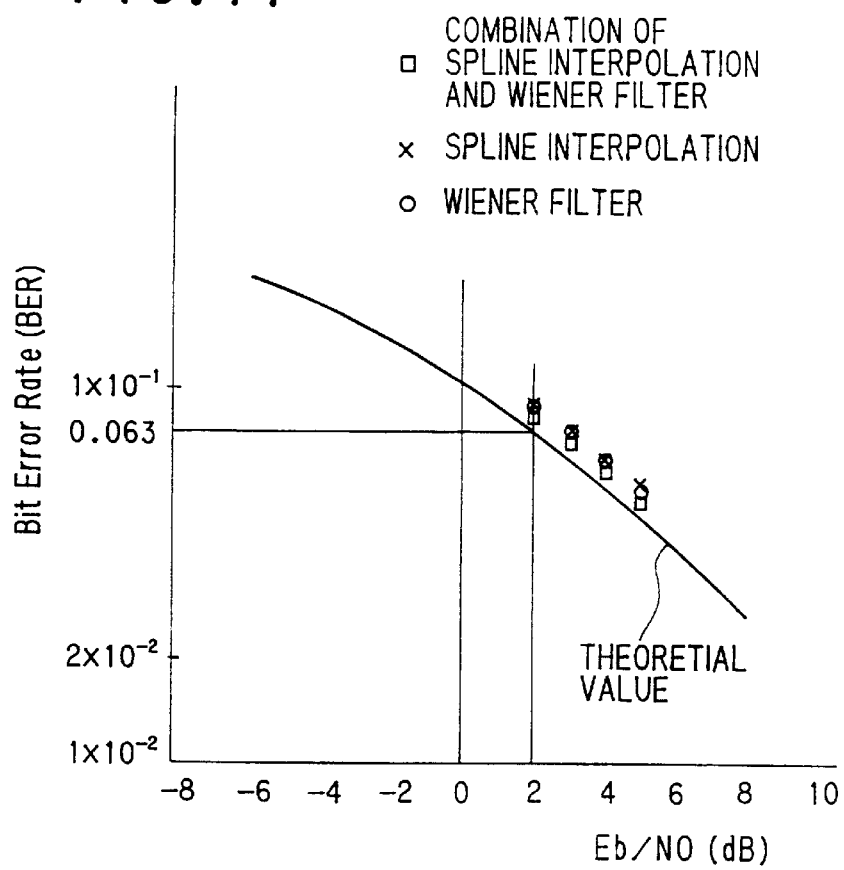
FIG. 14 is a graph showing the BER characteristic of the third embodiment.

FIG. 14 is a BER characteristic in the third embodiment. The conditions are signal-to-fading intensity C/M=7 dB and Doppler frequency=0.01. In FIG. 14, mark "□" indicates the result when the fading distortion of data D1, D5 is estimated using the spline interpolation by the spline interpolation coefficient calculator 17 and the fading distortion of data D2, D3 and D4 is estimated by the Wiener filter 16. Mark "O" indicates the result when the fading distortion of data is estimated by only the Wiener filter 16. Mark "X" indicates the result when the fading distortion of data is estimated by only the spline interpolation coefficient calculator 17. It will be appreciated that BER can be best approximated to its theoretical value by demodulating both ends of data using the spline interpolation estimation value by the spline interpolation coefficient calculator 17 and demodulating central part of data using the estimation value by the Wiener filter 16. For example, although when Eb/NO=2 the theoretical value of BER is 0.063, in case of the combined use of the Wiener filter and spline interpolation BER is 0.072, which is about 0.5 dB (Eb/NO converted) deteriorated from the theoretical value. On the other hand, in case of only the Wiener filter, BER is 0.076, which is about 0.7 dB deteriorated from the theoretical value. This means that a required BER to the demodulation device cannot be obtained.

Figure 15:
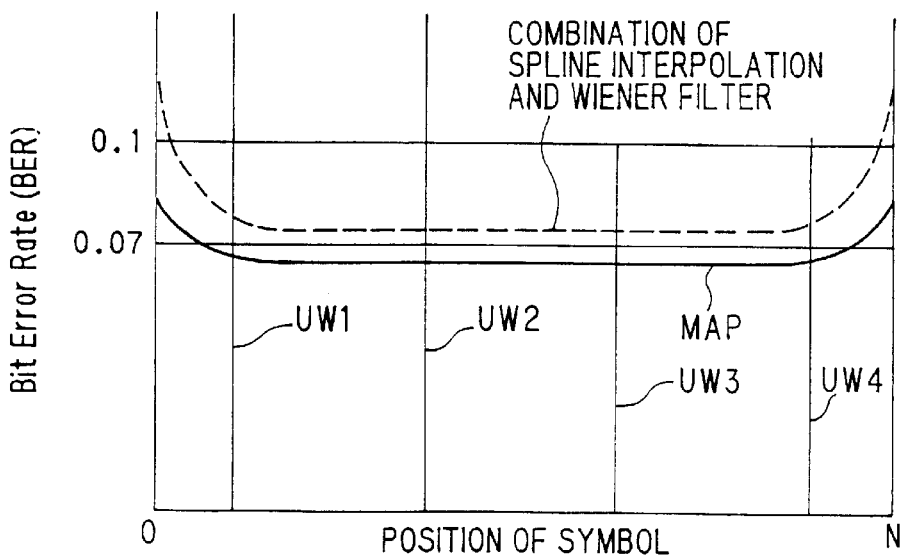
FIG. 15 is a graph showing the comparison between BERs in the first and third embodiments.

FIG. 15 shows the result that when Eb/NO=2 under the conditions of signal-to-fading intensity C/M=7 dB and Doppler frequency=0.01, BER in the first embodiment (using MAP in the operation units 5, 12) and BER in the third embodiment (using the spline interpolation coefficient calculators 15, 17 and the Wiener filter 16) are compared. The lateral axis indicates the position of symbol in burst signal with N symbols in relation with the positions of unique words UW1 to UW4. From this result, it is proved that the first embodiment is superior to the third embodiment.

Figure 16:
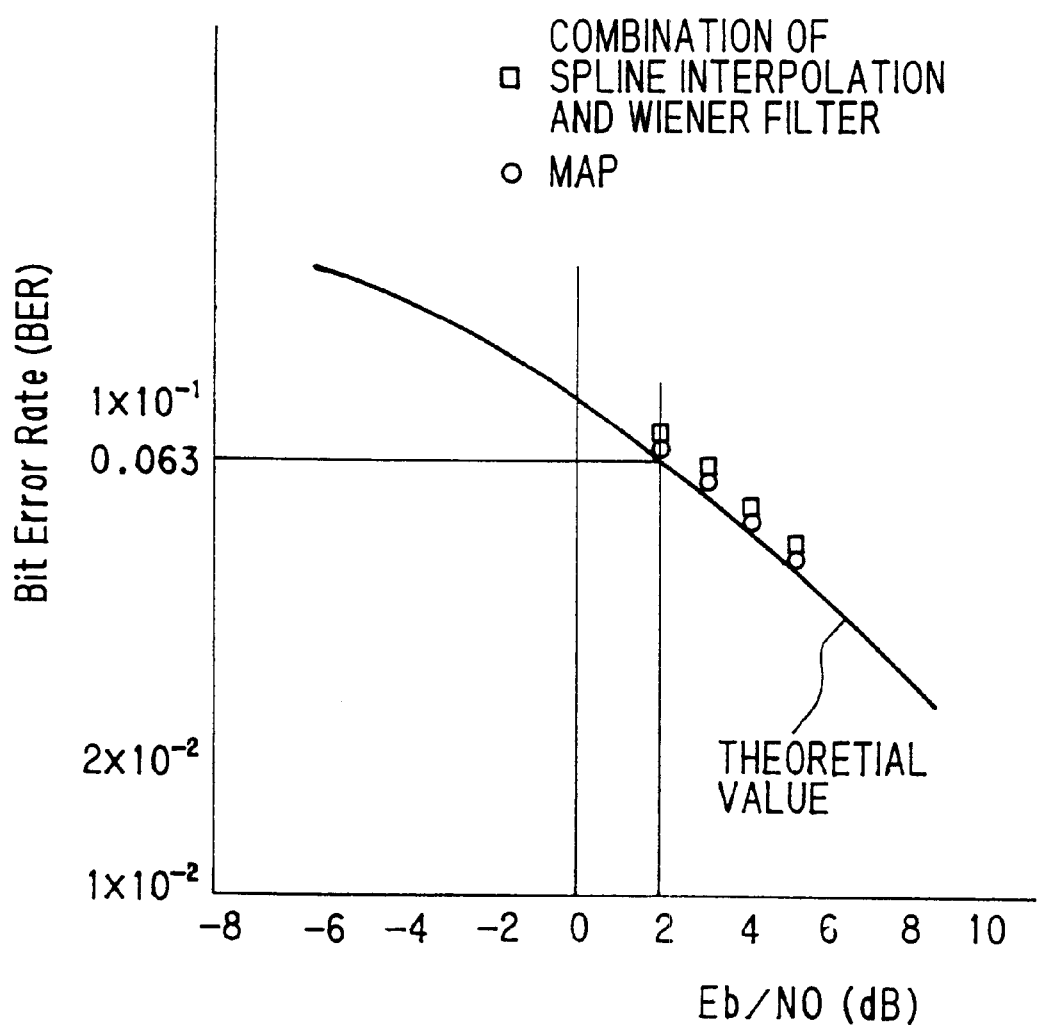
FIG. 16 is a graph showing the comparison between BERs in the first and third embodiments.

FIG. 16 shows the Eb/NO-to-BER relation of the first and third embodiments under the same conditions as those in FIG. 14. From this result, when Eb/NO=2 and using MAP, BER is 0.068, which is suppressed to a deterioration of about 0.2 dB (Eb/NO converted) from the theoretical value, 0.063.

Meanwhile, in case of the combined use of the spline interpolation and Wiener filter, as described referring to FIG. 14, the deterioration is about 0.5 dB. Thus, BER is improved by about 0.3 dB.

In the above embodiments, the phase modulation may be QPSK that the carrier is modulated with four values, and the communication system may be CDMA (code division multiple access). CDMA is the system that multiple signals use a common frequency by specific encrypted codes, and can apply to a method and device of the invention by using a signal format that pilot signal is inserted at intervals.

Also, the communicated signal does not have to be of burst type, and may be continuous wave. Further, the Wiener filter 16 or the spline interpolation coefficient calculator 17 may be used independently, and even when used combined, it is not limited to the assignments to the central part or the both ends as described above.

Furthermore, the composition that the first operation unit 5 in FIG. 5 counterchanges with the spline interpolation coefficient calculator 15 in FIG. 9, or the composition that the second operation unit 12 in FIG. 5 counterchanges with a block of the Wiener filter spline interpolation coefficient calculator 17 and signal mixer 18 in FIG. 9 is applicable.

In the above embodiments, UW1' to UW4' are formed extending the unique words UW1 to UW4. Alternatively, only the extended unique words UW5 to UW9 may be added while the unique words UW1 to UW4 are unaltered.

ADVANTAGES OF THE INVENTION

As described above, by setting the extended unique words inside data on the reception side in addition to the original unique words from the transmission side, the estimation of data fading distortion can be conducted at a high precision. Thereby, BER approximated to the theoretical value can be obtained at low Eb/NO without increasing the amount of operation. Hereupon, by extending the unique words up to part of data adjacent to the original unique words and setting the extended unique words inside data apart from the original unique words, the estimation of data fading distortion can be conducted at a higher precision. Also, when the fading distortion of data is estimated by using MAP, the degree of approximation can be enhanced higher than that by using the spline interpolation or Wiener filter, thereby obtaining BER further approximated to the theoretical value.

Although the invention has been described with respect to specific embodiment for complete and clear disclosure, the appended claims are not to be thus limited but are to be construed as embodying all modification and alternative constructions that may be occurred to one skilled in the art which fairly fall within the basic teaching here is set forth.

What is claim is:

1. A method for demodulating a received signal including a pilot signal while estimating the fading distortion of data by detecting the fading distortion of a unique word as said pilot signal inserted into multiple sections of said received signal, comprising the steps of:

(1) setting part of data as an extended unique word;
   (2) detecting the fading distortion of said unique word as said pilot signal as a first fading distortion and detecting the fading distortion of said extended unique word as a second fading distortion;
   (3) estimating the fading distortion of data based on said first and second fading distortions; and
   (4) demodulating data based on said fading distortion of data.

2. A method for demodulating a received signal including a pilot signal, according to claim 1, wherein:

said step (1) includes a step of setting part of data that is apart from said unique word as said pilot signal as said extended unique word independent of said unique word as said pilot signal.

3. A method for demodulating a received signal including a pilot signal, according to claim 1, wherein:

said step (1) includes the steps of setting part of data adjacent to said unique word as said pilot signal as a first extended unique word attached to said unique word as said pilot signal, and setting part of data that is apart from said unique word as said pilot signal as a second extended unique word independent of said unique word as said pilot signal; and said step (2) includes the steps of detecting the fading distortion of said first extended unique word as said first fading distortion, and detecting the fading distortion of said second extended unique word as said second fading distortion.

4. A method for demodulating a received signal including a pilot signal, according to claim 1, wherein:

said steps (1) to (4) are conducted based on said received signal that is stored into memory in units of a burst signal.

5. A method for demodulating a received signal including a pilot signal while estimating the fading distortion of data by detecting the fading distortion of a unique word as said pilot signal inserted into multiple sections of said received signal, comprising the steps of:

(1) setting part of data adjacent to said unique word as a first extended unique word attached to said unique word;

(2) setting part of data that is apart from said unique word as a second extended unique word independent of said unique word;

(3) estimating the fading distortion of said first and second extended unique words;

(4) estimating the fading distortion of data in said received signal based on said fading distortion of said first and second extended unique words; and (5) demodulating data in said received signal based on the estimation result of fading distortion of data in said received signal.

6. A method for demodulating a received signal including a pilot signal, according to claim 5, wherein:

said step (3) includes the steps of estimating the fading distortion of said first extended unique word based on a known value of said unique word and the provisional hard decision result of said adjacent part of data demodulated, and estimating the fading distortion of said second extended unique word based on the provisional hard decision result of said independent part of data demodulated.

7. A method for demodulating a received signal including a pilot signal, according to claim 5, wherein:

said step (4) includes the step of estimating the fading distortion of data in said received signal using MAP operation represented by:

$$\hat{c}_k = r_k^H \cdot (R_D + N_0)^{-1} \cdot a_T$$

$$R_D = \begin{bmatrix} \alpha(p_0 - p_0) & \alpha(p_0 - p_1) & \cdots & \alpha(p_0 - p_{n-1}) \\ \alpha(p_1 - p_0) & \alpha(p_1 - p_1) & \cdots & \alpha(p_1 - p_{n-1}) \\ \vdots & \vdots & \ddots & \vdots \\ \alpha(p_{n-1} - p_0) & \alpha(p_{n-1} - p_1) & \cdots & \alpha(p_{n-1} - p_{n-1}) \end{bmatrix}$$

$$r_k^H = (\alpha(k-p_0)\alpha(k-p_1) \ldots \alpha(k-p_{n-i})) \quad (5)$$

where $$R_D = \begin{bmatrix} \alpha(p_0 - p_0) & \alpha(p_0 - p_1) & \cdots & \alpha(p_0 - p_{n-1}) \\ \alpha(p_1 - p_0) & \alpha(p_1 - p_1) & \cdots & \alpha(p_1 - p_{n-1}) \\ \vdots & \vdots & \ddots & \vdots \\ \alpha(p_{n-1} - p_0) & \alpha(p_{n-1} - p_1) & \cdots & \alpha(p_{n-1} - p_{n-1}) \end{bmatrix}$$

and R,N indicate covariance matrices, $\lambda$ indicates Doppler frequency, rk indicates correlation between kth symbol and respective unique words, a indicates a vector of reverse-modulated unique word, and $p_0$ to $p_{n-1}$ indicate positions of unique words in burst signal, based on the fading distortion of said first and second extended unique words.

8. A method for demodulating a received signal including a pilot signal, according to claim 5, wherein:

said step (4) includes the step of estimating the fading distortion of data in said received signal using the spline interpolation calculation based on the fading distortion of said first and second extended unique words.

9. A method for demodulating a received signal including a pilot signal, according to claim 5, wherein:

said step (4) includes the step of estimating the fading distortion of data at both ends of said burst signal and estimating the fading distortion of data at central part except said both ends of a burst signal.

10. A method for demodulating a received signal including a pilot signal, according to claim 5, wherein:

said steps (1) to (5) are conducted based on said received signal that is stored into memory in units of a burst signal.

11. A method for demodulating a received signal including a pilot signal while estimating the fading distortion of data by detecting the fading distortion of a unique word as a pilot signal inserted into multiple sections of said received signal, comprising the steps of:

(1) detecting the first-stage fading distortion of the unique word in said multiple sections by comparing the unique word in said multiple sections with a known unique word;

(2) estimating the first-stage fading distortion of data in said received signal by conducting the first-stage MAP operation based on said first-stage fading distortion of the unique word in said multiple sections;

(3) demodulating said received signal based on said first-stage fading distortion of data in said received signal and then outputting a demodulated signal;

(4) comparing said demodulated signal with a predetermined threshold value and then outputting a binary signal as the comparison result;

(5) detecting the second-stage fading distortion of the unique word in said multiple sections by comparing the unique word in said multiple sections with a known unique word;

(6) detecting the fading distortion of part of data adjacent to the unique word in said multiple sections and part of data apart from the unique word in said multiple sections by comparing said part of data adjacent to and apart from the unique word in said multiple sections with said binary signal;

(7) estimating the second-stage fading distortion of data in said received signal by conducting the second-stage MAP operation based on said second-stage fading distortion of the unique word in said multiple sections and said fading distortion of said part of data adjacent to and apart from the unique word in said multiple sections; and (8) demodulating data in said received signal delayed for a predetermined time based on said second-stage fading distortion of data.

12. A method for demodulating a received signal including a pilot signal while estimating the fading distortion of data by detecting the fading distortion of a unique word as said pilot signal inserted into multiple sections of said received signal, comprising the steps of:

(1) detecting a first-stage fading distortion of the unique word in said multiple sections by comparing the unique word in said multiple sections with a known unique word;

(2) calculating a first-stage spline interpolation curve based on said first-stage fading distortion of the unique word in said multiple sections and then estimating the first-stage fading distortion of data in the received signal from said first-stage spline interpolation curve;

(3) demodulating said received signal delayed for a predetermined time based on said first-stage fading distortion of data in said received signal and then outputting a demodulated signal;

(4) comparing said demodulated signal with a predetermined threshold value and then outputting a binary signal as the comparison result;

(5) detecting the second-stage fading distortion of the unique word in said multiple sections by comparing the unique word in said multiple sections of said received signal delayed for a predetermined time with a known unique word;

(6) detecting the fading distortion of part of data adjacent to the unique word in said multiple sections and part of data apart from the unique word in said multiple sections by comparing said part of data adjacent to and apart from the unique word in said multiple sections with said binary signal;

(7) calculating the second-stage spline interpolation curve based on said second-stage fading distortion of the unique word in said multiple sections and said fading distortion of said part of data adjacent to and apart from the unique word in said multiple sections, and then estimating the second-stage first fading distortion of data in said received signal delayed for a predetermined time from said second-stage spline interpolation curve;

(8) inputting said second-stage fading distortion of the unique word in said multiple sections and said fading distortion of said part of data adjacent to and apart from the unique word in said multiple sections to a Wiener filter, thereby estimating the second-stage second fading distortion of data in said received signal delayed for a predetermined time; and (9) demodulating data in said received signal delayed for a predetermined time based on said second-stage first and second fading distortions of data.

13. A method for demodulating a received signal including a pilot signal, according to claim 12, wherein:

said steps (1) to (9) are conducted based on said received signal that is stored into memory in units of a burst signal.

14. A method for demodulating a received signal including a pilot signal while estimating the fading distortion of data by detecting the fading distortion of a unique word as said pilot signal inserted into multiple sections of said received signal, comprising the steps of:

(1) detecting the fading distortion of the unique word in said multiple sections by comparing the unique word in said multiple sections with a known unique word;

(2) calculating a MAP algorithm based on said fading distortion of the unique word in said multiple sections;

(3) estimating the fading distortion of data in said received signal from the calculation result of said MAP algorithm; and (4) demodulating data in said received signal based on said fading distortion of data.

15. A method for demodulating a received signal including a pilot signal, according to claim 14, wherein:

said steps (1) to (4) are conducted based on said received signal that is stored into memory in units of a burst signal.

16. A method for demodulating a received signal including a pilot signal while estimating the fading distortion of data by detecting the fading distortion of a unique word as said pilot signal inserted into multiple sections of said received signal, comprising the steps of:

(1) detecting the fading distortion of said unique word in said multiple sections as first fading distortion by comparing the unique word in said multiple sections of said received signal with a known unique word;

(2) calculating a first MAP algorithm based on said first fading distortion;

(3) estimating the fading distortion of data in said received signal as second fading distortion from the calculation result of said first MAP algorithm;

(4) demodulating data based on said second fading distortion;

(5) conducting the provisional hard decision of said demodulated data and then outputting a value of said provisional hard decision;

(6) detecting the fading distortion of the unique word in said multiple sections as third fading distortion by comparing the unique word in said multiple sections of said received signal with a known unique word;

(7) detecting the fading distortion of data in said received signal delayed for a predetermined time as fourth fading distortion by comparing said data with the value of said provisional hard decision;

(8) calculating a second MAP algorithm based on said third and fourth fading distortions;

(9) estimating the fading distortion of data in said received signal as fifth fading distortion from the calculation result of said second MAP algorithm; and

(10) demodulating said data in said received signal delayed for a predetermined time based on said fifth fading distortion.

17. A method for demodulating received signal including a pilot signal, according to claim 16, wherein:

said steps (1) to (10) are conducted based on said received signal that is stored into memory in units of a burst signal.

18. A method for demodulating a received signal including a pilot signal while estimating the fading distortion of data by detecting the fading distortion of a unique word as said pilot signal inserted into multiple sections of said received signal, comprising the steps of:

(1) estimating the first fading distortion of data based on said fading distortion of the unique word;

(2) demodulating said data based on said first fading distortion of data;

(3) detecting the fading distortion of an extended unique word from said fading distortion of the unique word and the fading distortion of said data obtained based on the demodulation result of said data;

(4) estimating the second fading distortion of said data based on said fading distortion of an extended unique word;

(5) demodulating said data based on said second fading distortion of said data; and (6) discontinuing said steps (3) to (5) according to the level of said first and second fading distortion of said data, then outputting the modulation result of said data at said step (2).

19. A method for demodulating a received signal including a pilot signal, according to claim 18, wherein:

said steps (1) to (6) are conducted based on said received signal that is stored into memory in units of a burst signal.

20. A device for demodulating a received signal including a pilot signal while estimating the fading distortion of data by detecting the fading distortion of a unique word as said pilot signal inserted into multiple sections of said received signal, comprising:

means for detecting said fading distortion of said unique word as first fading distortion and detecting the fading distortion of an extended unique word set at part of said data as second fading distortion;

means for estimating the fading distortion of said data in said received signal based on said first and second fading distortions; and means for demodulating said data in said received signal based on said fading distortion of said data.

21. A device for demodulating a received signal including a pilot signal, according to claim 20, wherein:

said detecting means detects said first fading distortion based on the fading distortion of said unique word and data adjacent to said unique word, and detects said second fading distortion based on the fading distortion of data apart from said unique word.

22. A device for demodulating a received signal including a pilot signal, according to claim 20, wherein:

said detecting means detects said first fading distortion by comparing said unique word in said multiple sections inserted into a burst signal that has a given number of symbols and is received as said received signal with a known unique word, and detects said second fading distortion by comparing part of data in said burst signal with a value of provisional hard decision to previously-demodulated signal.

23. A device for demodulating a received signal including a pilot signal, according to claim 20, wherein:

said detecting means detects said first fading distortion by comparing said unique word in said multiple sections inserted into a burst signal that has a given number of symbols and is received as said received signal with a known unique word, said burst signal being phase-modulated by BPSK (binary phase shift keying) or OPSK (quadrature phase shift keying) and received by TDMA (time division multiple access) system or CDMA (code division multiple access) system, and detects said second fading distortion by comparing part of data in said burst signal with a value of provisional hard decision to previously demodulated signal.

24. A device for demodulating a received signal including a pilot signal, according to claim 20, further comprising:

means for storing said received signal in units of a burst signal and outputting said received signal to said detecting means, said estimating means and said demodulating means.

25. A device for demodulating a received signal including a pilot signal while estimating the fading distortion of data by detecting the fading distortion of a unique word as said pilot signal inserted into multiple sections of said received signal, comprising:

means for detecting the fading distortion of said unique word in the multiple sections of said received signal by comparing a unique word in the multiple sections and a known unique word;

means for calculating a MAP algorithm based on the fading distortion of said unique word in the multiple sections, and estimating the fading distortion of data in said received signal from the calculation result; and means for demodulating data in said received signal based on said fading distortion of said data.

26. A device for demodulating a received signal including a pilot signal, according to claim 25, further comprising:

means for storing said received signal in units of a burst signal and outputting said received signal to said detecting means, said calculating means and said demodulating means.

27. A device for demodulating a received signal including a pilot signal while estimating the fading distortion of data by detecting the fading distortion of a unique word as said pilot signal inserted into multiple sections of said received signal, comprising:

a first detection means for detecting the fading distortion of said unique word in the multiple sections of said received signal as first fading distortion by comparing said unique word in the multiple sections and a known unique word;

a first calculation means for calculating a first MAP algorithm based on said first fading distortion;

a first estimation means for estimating the fading distortion of data in said received signal as second fading distortion from the calculation result of said first MAP algorithm;

a first demodulation means for demodulating data delayed for a predetermined time based on said second fading distortion;

a decision means for conducting the provisional hard decision of said demodulated data and then outputting a value of the provisional hard decision;

a second detection means for detecting the fading distortion of said unique word in the multiple sections of said received signal delayed for a predetermined time as third fading distortion by comparing said unique word in the multiple sections and a known unique word;

a second calculation means for calculating a second MAP algorithm based on said third and fourth fading distortions;

a second estimation means for estimating the fading distortion of data in said received signal as fifth fading distortion from the calculation result of said second MAP algorithm; and a second demodulation means for demodulating data delayed for a predetermined time based on said fifth fading distortion.

28. A device for demodulating a received signal including a pilot signal, according to claim 27, further comprising:

means for storing said received signal in units of a burst signal and outputting said received signal to said first and second detection means, said first and second calculation means, and said first and second demodulation means.

29. A device for demodulating a received signal including a pilot signal while estimating the fading distortion of data by detecting the fading distortion of a unique word as said pilot signal inserted into multiple sections of said received signal, comprising:

a first detection means for detecting the first-stage fading distortion of said unique word in the multiple sections of said received signal as first fading distortion by comparing the unique word in the multiple sections and a known unique word;

a first spline interpolation estimation means for calculating a first-stage spline interpolation curve based on said first-stage fading distortion of the unique word in the multiple sections, and estimating the first-stage fading distortion of data in said received signal from said first-stage spline interpolation curve;

a first demodulation means for demodulating said received signal based on said first-stage fading distortion of data in said received signal and then outputting a demodulated signal;

a decision means for comparing said demodulated signal with a predetermined threshold value and then outputting a binary signal;

a second detection means for detecting the second-stage fading distortion of the unique word in the multiple sections of said received signal by comparing the unique word in the multiple sections and a known unique word, and detecting the fading distortion of part of data adjacent to the unique word in the multiple sections and part of data apart from the unique word in the multiple sections by comparing part of data adjacent to and apart from the unique word with said binary data;

a second spline interpolation estimation means for calculating a second spline interpolation curve based on the output of said second detection means, and estimating the second-stage first fading distortion of data in said received signal from said second spline interpolation curve;

a Wiener filter means for being fed with the output of said second detection means and then estimating the second-stage second fading distortion of data in said received signal;

and a second demodulation for demodulating data in said received signal based on said second-stage first and second fading distortions of said data.

30. A device for demodulating a received signal including a pilot signal, according to claim 29, wherein:

said second spline interpolation estimation means includes a spline interpolation coefficient calculator that estimates the fading distortion of data at both ends of a burst signal as said second-stage first fading distortion; and said Wiener filter means includes a Wiener filter that estimates the fading distortion of data at a central part except said both ends of said burst signal as said second-stage second fading distortion.

31. A device for demodulating a received signal including a pilot signal, according to claim 29, further comprising:

means for storing said received signal in units of a burst signal and outputting said received signal to said first and second detection means, and said first and second demodulation means.

32. A device for demodulating a received signal including a pilot signal while estimating the fading distortion of data by detecting the fading distortion of a unique word as said pilot signal inserted into multiple sections of said received signal, comprising:

a first estimation means for estimating the first fading distortion of data based on said fading distortion of said unique word;

a first demodulation means for outputting first demodulated signal of said data based on said first fading distortion of data;

a detection means for detecting the fading distortion of an extended unique word from said fading distortion of said unique word and the second fading distortion of said data estimated based on a value of the provisional hard decision of said demodulated signal of said data, a second estimation means for estimating the second fading distortion of said data based on said fading distortion of said extended unique word;

a second demodulation means for outputting second demodulated signal of said data based on said second fading distortion of said data;

an output circuit for outputting said demodulated signal to a subsequent-stage circuit; and a control means for selectively connecting said first or second demodulation means to said output circuit according to the level of said first and second fading distortion of said data, for controlling said detection means, said second estimation means and second demodulation means not to operate when said first demodulation means is connected to said output circuit.

33. A device for demodulating a received signal including a pilot signal, according to claim 32, further comprising:

means for storing said received signal in units of a burst signal and outputting said received signal to said first and second estimation means, and said first and second demodulation means.

* * * * *